United States Patent [19]

Morrison

[11] Patent Number: 4,980,608
[45] Date of Patent: Dec. 25, 1990

[54] ELECTRIC MOTOR ROTATOR FOR CHRISTMAS TREE ORNAMENTS

[76] Inventor: David Morrison, 2470 Shallowford Rd., Atlanta, Ga. 30345

[21] Appl. No.: 239,707

[22] Filed: Sep. 2, 1988

Related U.S. Application Data

[63] Continuation-in-part of Ser. No. 842,799, Mar. 24, 1986, abandoned.

[51] Int. Cl.⁵ .............................................. H05B 37/00
[52] U.S. Cl. .............................. 315/185 S; 315/185 R; 315/361; 315/179; 362/806
[58] Field of Search ................ 315/185 R, 185 S, 361, 315/79, 360, 362, 186, 179; 362/806; 361/23; 307/38; 310/254, 40 R

[56] References Cited

U.S. PATENT DOCUMENTS

| | | | |
|---|---|---|---|
| 1,922,022 | 8/1933 | Barnett | 315/185 R |
| 1,974,472 | 9/1934 | Seghers | 240/10 |
| 3,862,434 | 1/1975 | Davis, Jr. | 307/132 |
| 3,864,580 | 2/1975 | Davis, Jr. | 307/31 |
| 3,873,880 | 3/1975 | Riddell | 315/53 |
| 3,944,878 | 3/1976 | Gerontakis | 315/316 |
| 4,682,079 | 10/1984 | Sanders et al. | 315/186 |

Primary Examiner—Michael Razavi
Attorney, Agent, or Firm—James A. Hinkle

[57] ABSTRACT

This invention pertains to the an electric motor of very small size which is adapted to plug into a lamp socket of a string-set of series connected decorative incandescent lamps so as to utilize the output of the motor to rotate ornaments and like devices. A particular electrical motor of unique design and geared output is shown.

7 Claims, 3 Drawing Sheets

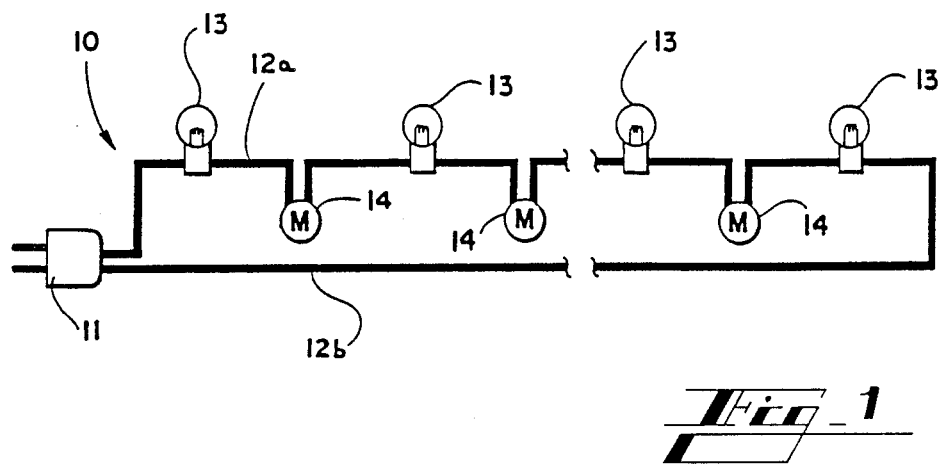
Fig_1
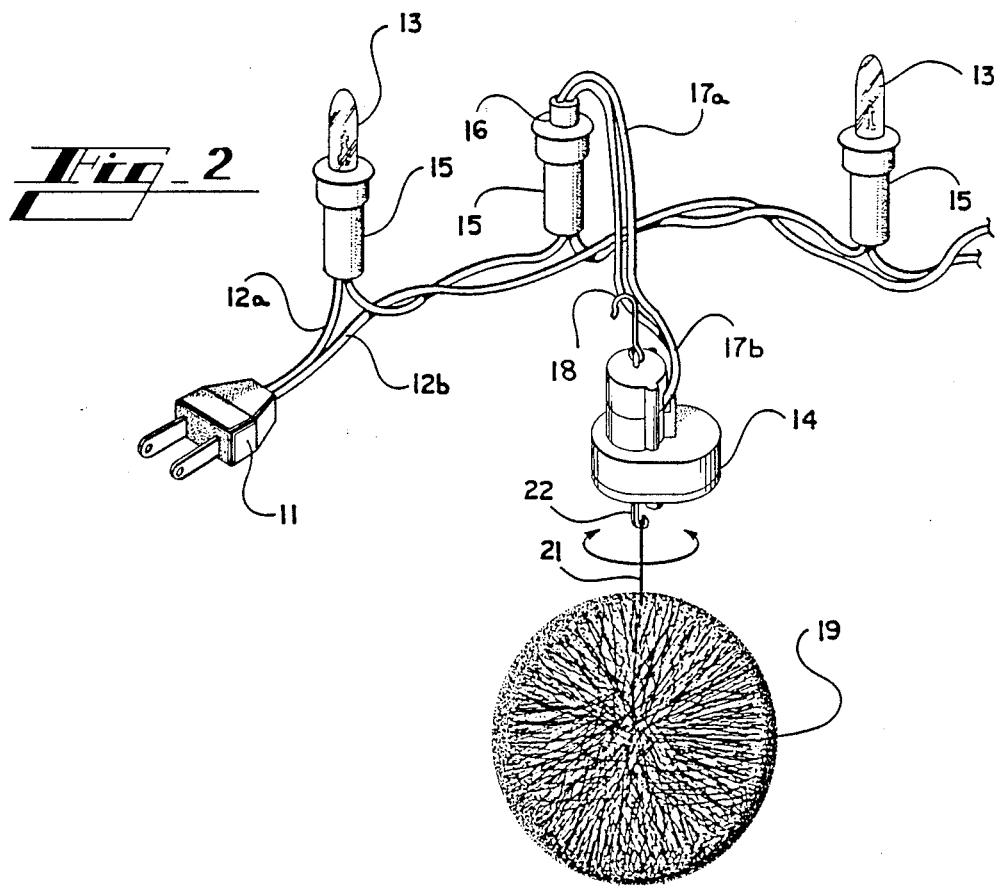
Fig_2

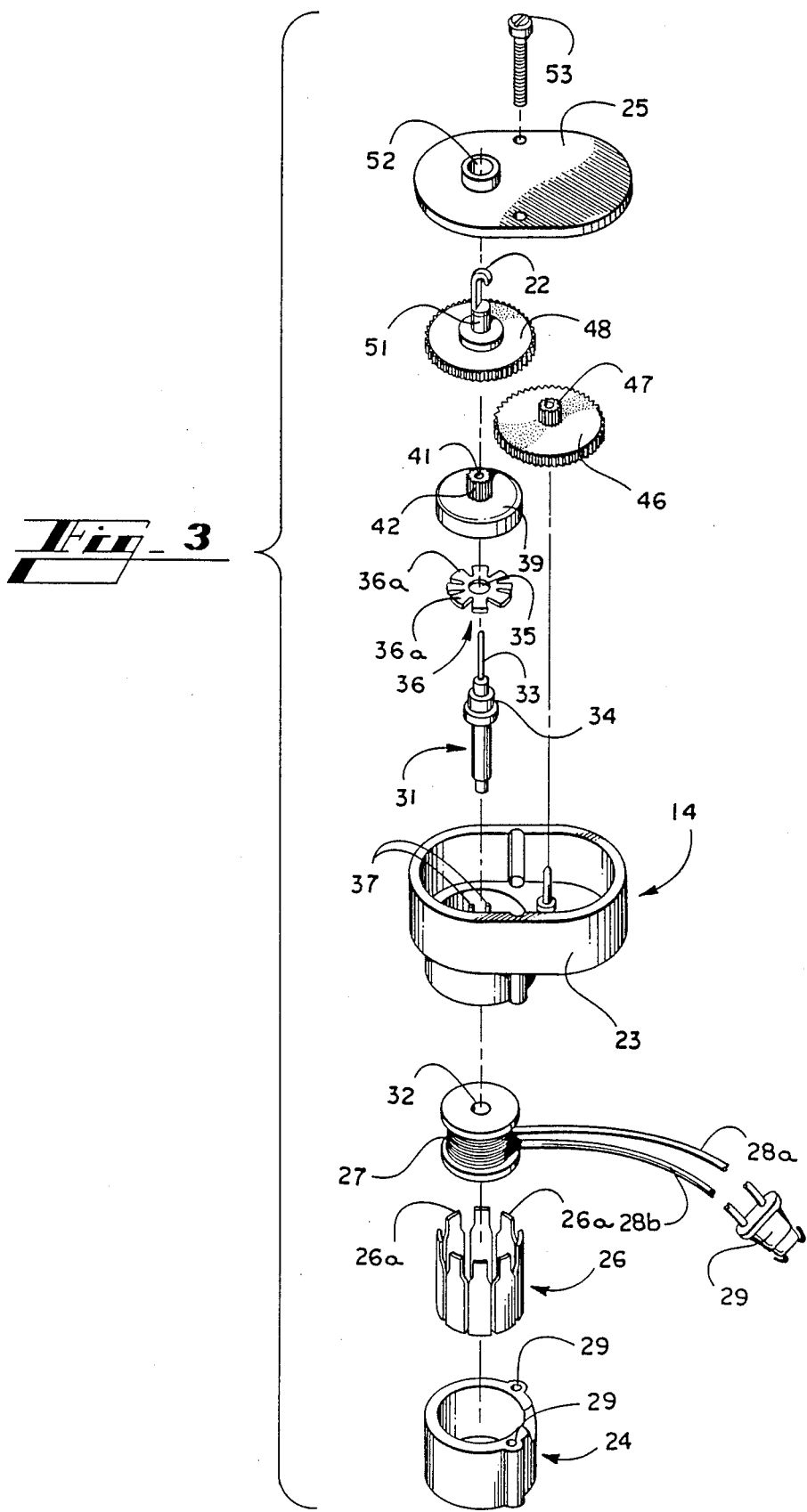

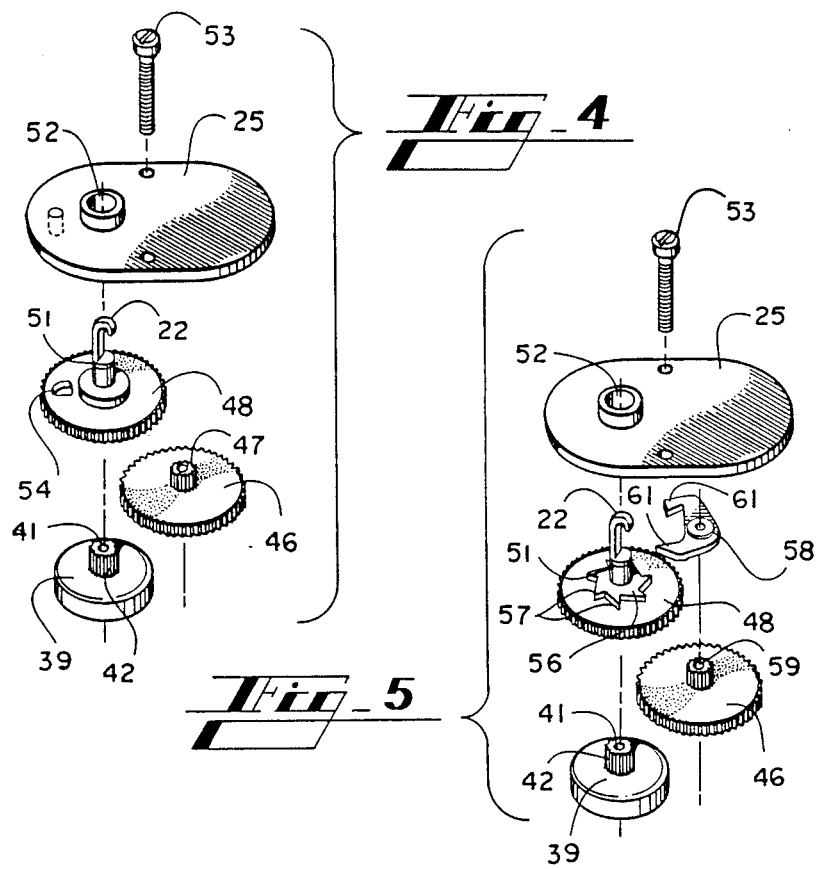
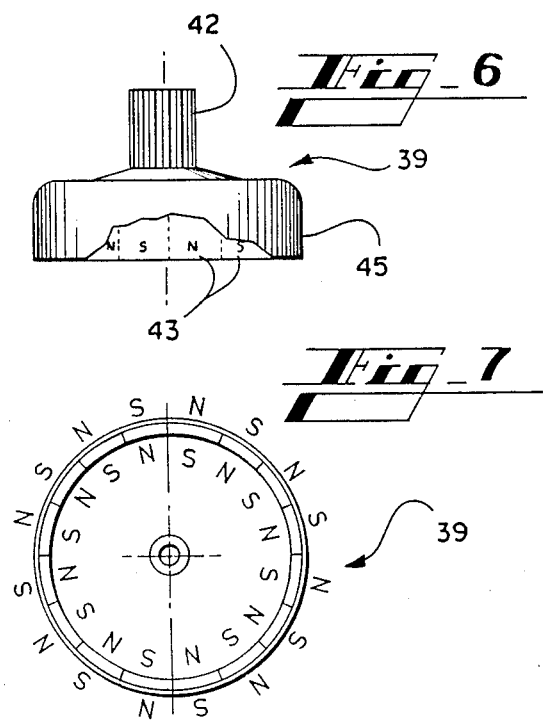

4,980,608

ELECTRIC MOTOR ROTATOR FOR CHRISTMAS TREE ORNAMENTS

This application is a continuation-in-part of co-pending U.S. patent application, Ser. No. 06/842,799 filed on Mar. 24, 1986 and now abandoned.

BACKGROUND OF THE INVENTION

I. Field of the Invention

The present invention relates generally to string sets of series connected decorative incandescent lamps particularly adaptable to Christmas tree lighting. More particularly the invention relates to a string set wherein one or more of the individual lamps are replaced by a small electric motor plugged into the lamp receptacle and utilized to rotate Christmas tree ornaments or like devices.

II. Description of the Prior Art

It has been well known heretofore to provide strings of miniature decorative incandescent lamps which comprises a large number of miniature sockets, each of which have a miniature lamp press-fitted therein. This type of arrangement enabled both the sockets and the lamps to be of very simple design and of small size and low cost. The prior art is replete with patents describing string-sets of miniature lamps which are electrically series connected, and such does not need to be further elucidated upon at this point.

However, a failing of the lamp sets of the prior art is that there is no provision to incorporate devices integral with the lamp string-sets which will rotate Christmas tree ornaments that may be attached to such devices. Of course there are decorative lamps which possibly may act as ornaments, but these lamps are not a rotating ornament. There are electric motors on the market that could be used for the purpose presented herein, but they would not be practical because they are very bulky and use considerable energy. Further, there is one type of ornament for use with lamp string-sets currently on the market which uses a mechanism that rotates an internal ornament, however, it is quite expensive and utilizes a complex electronic mechanism that relegates the ornament to a very limited market.

SUMMARY OF THE INVENTION

It is, therefore, an object of the present invention to provide a decorative string-set of series connected decorative incandescent lamps wherein one or more lamps of the string-set may be removed and an electric motor may be inserted into one or more of the lamp sockets to provide continuous rotation or animation to otherwise dormant Christmas tree ornaments.

An object of the invention is also to provide a unique electrical motor with a particular geared output which accomplishes the rotational effect and animation of Christmas tree ornaments.

Other objects of the invention will become obvious from the following description of the preferred embodiment.

BRIEF DESCRIPTION OF THE DRAWINGS

FIG. 1 is an electrical schematic of a string-set of series connected decorative incandescent lamps showing the proposed motor connected in series with the various lamps;

FIG. 2 is a perspective view showing the string of lamps with the rotating motor connected to the string by means of a push-in type plug fitted into a lamp socket and further showing a typical ornament hanging from the output of the motor on a rotational hanger;

FIG. 3 is an exploded perspective view of the small electric motor of the present invention including the geared output;

FIG. 4 is an exploded perspective view showing one embodiment of the geared output of the electric motor of the present invention;

FIG. 5 is an exploded perspective view of a second embodiment of the geared output of the electric motor of the present invention;

FIG. 6 is an enlarged view showing a cutaway portion of the rotor of the electric motor; and FIG. 7 is a view looking into the bottom, hollow interior of the rotor of the electric motor.

DESCRIPTION OF THE PREFERRED EMBODIMENT

Referring to the drawings, wherein like numerals designate corresponding parts throughout the several figures, a string-set of series connected incandescent lamps is indicated by numeral 10. As is the normal situation, the string-set 10 comprises an electrical power plug 11 which is designed to fit into a normal wall socket that supplies electrical energy to the ultimate user. The electrical power plug 11 supplies energy to the string-set 10 through conductor 12a to the various press-fitted lamps 13 and the rotator motors of the present invention, indicated by numeral 14. Inasmuch as the standard string-set of lights comprise at times up to 50 or more lights, FIG. 1 is depicted schematically showing only a few lights and then is shown in broken section to eliminate any undue detail in the drawing. The complete circuit of the string-set 10 is completed through conductor 12b.

Turning now to FIG. 2, the string-set 10 is more clearly shown and indicates the typical lamp and socket arrangement currently utilized on such sets in the market place. The press-fitted lamp 13 is usually the type whose base has relatively parallel flattened sides which are designed to matingly engage with the interior of the lamp socket 15. Consequently it is proposed that the base of the press-fitted motor plug 16 of the rotator motor will be similar in design to the normal press-fitted lamp base. From the motor plug 16 there are motor conductors 17a and 17b which supply power from the motor plug 16 to the motor 14. To facilitate hanging the motor on a Christmas tree or other object as desired, the motor is equipped with a hanger 18 which will effectively attach the motor to the object desired.

Since it is the object of the motor 14 to rotate an ornament, there is provided, as shown in FIG. 2, an ornament 19 attached to an ornament hanger 21 which is releasably fixed to the attachment hook 22 of the motor.

As previously stated, a typical string of Christmas tree lights as described herein is usually found to be 35 or 50 lights per string. All of the light bulbs are connected in series to a 120 volt a.c. supply. Even though the voltage across these bulbs is different in the 35 and 50 string light sets, the current through the bulbs is still in the range of 0.120 to 0.160 amperes. If such a motor as indicated by the numeral 14 in the drawings replaces one of the bulbs in the light string, it will operate properly if the coil of the motor has approximately 262 turns of wire (32 to 42 ampere turns) and, therefore, using the proper wire size with proper resistance the impedance of the motor could be the same as the light bulb and therefore interchangeable in the light string.

Of course such a motor as designated herein would, once started, run in one direction or the other. Because of the type of the design there would be no advance knowledge of which way the motor would turn when the light string would be energized. However in the particular environment that the motor is being used, this would cause no particular problem. If, for instance, a user would want to have a motor running in one direction only it is a simple matter of including in the motor a so-called "no-back" device to cause the motor to run in a predetermined direction each time it is energized. A design for such a "no-back" design is shown in FIG. 5.

Another possibility for rotational control would be to put a so-called twinkle light bulb in the series circuit so that the twinkle light bulb would de-energize the circuit as is well known, thereby stopping the rotation. When the circuit would be re-energized due to the action of the twinkle light bulb, the very interesting effect as sometimes a motor will stop, hesitate motor might run in an opposite direction. This would create a and may then start to run in the same or reverse direction creating a pleasant effect for the user. A similar effect can be achieved by the structure as shown in FIG. 4.

To provide gearing for the motor, the inventor shows that he has designed a gear train with the motor pinion having eight teeth, the intermediate gear having sixty teeth, the pinion attached to the intermediate gear having eight teeth, and the output gear driven by the intermediate gear pinion having forty teeth producing an output shaft rotating at 12 rpms. Such a motor, as provided, can start and run and provide good torque over a range of 20 to 50 ampere turns in the coil. Of course, the motor mechanism can also be arranged to operate and provide an output shaft when mounted in a horizontal position, or when operating inverted.

The electric motor 14 of the present invention is an inductor motor having a permanent magnet rotor of unique design. The motor assembly 14 comprises a housing 23, a motor cover 24 and a gear cover 25.

Referring to FIG. 3 which shows the exploded perspective view of the motor, it can be seen that within motor assembly 14 there are multiple parts housed in the motor cover. The outer stator 26 is designed to have 8 poles 26a as shown in the embodiment herein. Lying within the stator is a coil 27 which is made of approximately 262 turns of number 42 magnet wire in which the coil will have a DC resistance of approximately 18 ohms. This configuration will give the motor approximately the same impedance as a miniature push-in light bulb and therefore make the motor interchangeable with the miniature bulb of a typical string of Christmas tree lights. The coil is designed to have a pair of conducting wires 28a and 28b which terminate in a miniature push-in type plug 29. The plug is of the type which is designed to push into a bulb receptacle in a typical string of Christmas tree lights. As noted, the coil will be seated within the outer stator 26 which, in turn rests in the motor cover 24. This subassembly would then be affixed to the housing 23 by screw fasteners (not shown) fitted through screw apertures 29.

In order to complete the electric motor and to impart rotational ability to it, an armature 31 would then be placed into the receiving aperture 32 of the coil. As can be seen, especially in FIG. 3, the core has a proximal end which is designed to be received by the aperture 32; and a distal end which is a rotor shaft 33 designed to be fitted into the rotor body. Between the rotor shaft 33 and the distal end of the armature is a stepped portion 34 which receives the receiving aperture 35 of the inner stator 36. The inner stator 36 then rests firmly upon the armature at the stepped area 34 and is prevented from rotation by a pair of lugs 37 which project between a pair of poles 38 of inner stator. The number of poles of the inner stator shall be the same as the poles of the outer stator and in the case herein, it is contemplated that there will be 8 inner poles and 8 outer poles.

To provide rotation energy to the motor output, a rotor 39 is provided which is so designed that the central aperture 41 rests upon and is in rotational relationship with the rotor shaft 33. Forming the aperture 41 is a rotor pinion 42 which is located atop the rotor cup 39. As can be seen, the rotor cup 39 is of small design and is preferably molded of thermoplastic material wherein the cup portion of the rotor has an inside surface which supports the electrical rotor material such as a low density barium ferrite. Normally, the barium ferrite would be impregnated in a rubber binder and then placed on the inside surface of the rotor cup to perform the intended interaction between the inner and outer stators. The rotor material 43 is secured in the relatively light rotor support cup and is magnetized around the periphery of the rotor as shown more particularly in FIGS. 6 and 7 wherein the magnetization results in 16 segments forming alternate north and south poles. As can be seen, the motor is, by nature, a synchronous motor and is of exceedingly simple and rugged construction and can be easily mass produced. Since the rotor density is low with a large magnetic working area, the ratio of moment of enertia of the rotor to the torque developed by the rotor is low therefore allowing the motor to move into synchronism rapidly. As is seen in FIG. 7, the rotor 39 comprises 16 magnetized segments indicated by numeral 44. Each segment is alternately magnetized in the conventional way.

When the electric motor is fully assembled, it can be seen from FIG. 3 that the rotor 39 is rotatably supported on rotor shaft 33 and the depending side wall 45 of the rotor rests, when in operative position, between the poles of the inner stator 36 and the outer stator 26. It is apparent that both the inner stator and the outer stator each have 8 poles which cooperate with the 16 magnetized segments 44 of the rotor. It should be noted that it is not absolutely necessary to have an inner stator as described. The motor could utilize pairs of stator poles to interact with each rotor segment using leakage flux to interact between the stator poles and the rotor.

To effect the output from the motor the rotor pinion 42 engages the intermediate gear 46 and pinion 47. Thus the output from pinion 47 then engages the output gear wheel 48 which, in turn, moves the rotating hook 22 in the desired fashion. When fully assembled, shaft 51 of the rotating hook projects through aperture 52 of gear cover 25 and provides means for attaching a desired tree ornament to the electric motor. The final assembly of the motor includes a pairs of fastening screws 53 which project through the gear cove& 25, the housing 23 and terminates in the motor cover 24 to maintain the operative parts in final assembly.

The operation of the type of motor shown within the present invention is well understood in the art of synchronous motors. The combination of the inner and outer stator provide 8 pole pairs equally aligned in a circular configuration encompassing 16 magnetized segments in the rotor. The motor, when deenergized, will cause the rotor to come to rest with each pole pair aligned with alternate segments of the rotor. When the motor is energized, as a result of current passing through the coil 27, each of the stator pole pairs will pass a flux field through the aligned rotor segment so that the rotor will immediately rotate to synchronous speed due to the opposite polarity of the flux field in relation to the rotor segment. There is a possibility that the rotor will remain motionless until the polarity of the stator poles are reversed at which time, the rotor will rotate and accelerate to synchronous speed.

The rotor may start in either direction and because of this, it may be desired to include a device such as a reversing mechanism to ensure that rotation of the motor will be in the desired direction. If it is desired to operate the motor in one particular direction, the reversing mechanism will stop the rotation in the wrong direction but will allow rotation in the desired direction and cause the rotor to stop and reverse to the desired direction. FIG. 4 shows one embodiment of a reversing mechanism wherein the output wheel 48 has a reversing tab 54 projecting from the upper surface thereof. Tab 54 is designed to cooperate with the depending reversing peg 55 located on the underside of the gear cover 25. In the embodiment shown in FIG. 4, when the motor begins to rotate the rotation will be in a particular direction and once the tab 48 impinges against peg 55, the motor will automatically reverse and rotate approximately 360° until the tab 48 impinges against the peg 55 going in the opposite direction at which time it will again reverse direction and continue to do this as long as the motor is energized.

In FIG. 5, another embodiment is shown which effects a "no back" movement of the motor to ensure rotation of the motor in the desired direction. In this particular embodiment the output wheel 48 has a rachet 56 affixed around the central shaft 51. The ratchet has a series of teeth 57 projecting from the periphery thereof which will cooperatively relate to the pawl 58 which is mounted on shaft 59. The shaft 59 projects from the intermediate gear 46 for the purpose of maintaining the pawl 58 in its operative position. As is well known in the art. The opposing legs 61 of the pawl operate against the ratchet teeth 57 to prevent the output wheel 48 from turning in but one desired direction.

A permanent magnet inductor motor, such as the motor shown herein, must be allowed to start in either direction before the load is picked up. The starting motion is accomplished in the design of this motor by the backlash in the gear train before the static load is reached. Cooperating with the backlash in the present motor, the "no back" device shown in FIG. 5 is located at the position of the output gear to provide free motion to start and to run or, to reverse and run.

While the invention has been illustrated and described as embodied in a miniature socketed decorative string of series connected incandescent lamps, it is not intended to be limited to the details shown since various modifications and structural changes may be made without departing in any way from the spirit of the present invention. Various modifications may be made of the invention without departing from the scope thereof and it is desired, therefore, than only such limitations shall be placed thereon as are imposed by the prior art and which are set forth in the appended claims.

What is claimed is:

1. In a decorative string-set of series connected incandescent lamps having a plurality of lamp sockets connected to a power plug by an elongated flexible electrical conductor means interconnecting said lamp sockets in a string of series connected sockets, a predetermined number of incandescent lamps mounted in certain of said lamp sockets, the improvement comprising:

a predetermined number of miniature electrical motor means mounted in certain of said lamp sockets, said motor means comprising a synchronous inductor motor having a plug means adapted to interconnect the motor to a respective lamp socket and further having a motor hanger means, a power output means and an ornament hanger means geared to the power output means, the motor plug means being formed to matingly engage with any one of said lamp sockets to energize said motor means, the motor means further comprising an energizing coil, rotor means, stator means, the power output means being interconnected to the rotor means, the stator means comprising at least one stator assembly having multiple discrete poles, the rotor means comprising a rotor cup having a planar top surface and depending sidewalls to form an internal cavity, a magnetic medium formed upon the depending sidewalls within the internal cavity and providing multiple discrete segments of alternating polarity, wherein the sidewalls of the rotor cup are in juxtaposition with the stator means and are adapted to interact electrically with the stator means and a flux field produced by the motor coil to thereby produce rotational movement to the rotor means, said motor means having a predetermined impedance equivalent to that of one of said incandescent lamps so as to be fully interchangeable therewith whereby when said decorative string-set is electrically energized the electric motor is concurrently energized and causes the ornament hanger means to rotate.

2. The decorative string-set of series connected incandescent lamps as claimed in claim 1, wherein the motor stator means comprises two stator assemblies each having multiple discrete poles, the two stator assemblies being assembled in concentric relation with one another defining a predetermined air gap therebetween, the side walls of the rotor cup being positioned within the air gap between the two stator assemblies.

3. The decorative string-set of series connected incandescent lamps as claimed in claim 1, wherein the power output means includes a directional control mechanism to allow the ornament hanger means to rotate in a desired direction.

4. The decorative string-set of series connected incandescent lamps as claimed in claim 3, wherein the directional control mechanism comprises a reversing means in cooperation with the power output means to reverse the direction of rotation of the ornament hanger means at selected intervals.

5. The decorative string-set of series connected incandescent lamps as claimed in claim 4, wherein a mechanical tab mounted upon and rotating with a portion of the power output means impacts at said selected intervals with a stop member, thereby stopping rotation of the rotor means and causing the rotor means to reverse direction of rotation.

6. The decorative string-set of series connected incandescent lamps as claimed in claim 3, wherein the directional control mechanism comprises a means to limit the rotation of the ornament hanger mean in only one direction.

7. The decorative string-set of series connected incandescent lamps as claimed in claim 6, wherein the rotational limiting means comprises a pawl and ratchet mechanism mounted in conjunction with the power output means to selectively allow a unidirectional rotation of the ornament hanger means.

* * * * *